United States Patent
Bruland

(10) Patent No.: US 12,042,977 B2
(45) Date of Patent: Jul. 23, 2024

(54) METHOD FOR PRODUCING A HOLLOW ELECTRICAL INSULATOR, HOLLOW ELECTRICAL INSULATOR AND USE OF A HOLLOW ELECTRICAL INSULATOR

(71) Applicant: Maschinenfabrik Reinhausen GmbH, Regensburg (DE)

(72) Inventor: Matthias Bruland, Regensburg (DE)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 280 days.

(21) Appl. No.: 17/620,126

(22) PCT Filed: May 26, 2020

(86) PCT No.: PCT/EP2020/064549
§ 371 (c)(1),
(2) Date: Dec. 17, 2021

(87) PCT Pub. No.: WO2020/259939
PCT Pub. Date: Dec. 30, 2020

(65) Prior Publication Data
US 2022/0314525 A1 Oct. 6, 2022

(30) Foreign Application Priority Data
Jun. 28, 2019 (DE) .................... 10 2019 117 501.1

(51) Int. Cl.
*B29C 53/00* (2006.01)
*B29C 53/56* (2006.01)
(Continued)

(52) U.S. Cl.
CPC ............ *B29C 53/562* (2013.01); *B29C 70/32* (2013.01); *H01B 17/56* (2013.01); *H01B 19/00* (2013.01);
(Continued)

(58) Field of Classification Search
None
See application file for complete search history.

(56) References Cited

U.S. PATENT DOCUMENTS 1,641,270 A * 9/1927 Horelick .............. H01B 17/301
174/31 R
4,833,278 A * 5/1989 Lambeth .............. H01B 17/525
174/209

(Continued)

FOREIGN PATENT DOCUMENTS

CN 107086093 A 8/2017
DE 3889487 T2 9/1994
(Continued)

*Primary Examiner* — Krystal Robinson
(74) *Attorney, Agent, or Firm* — Leydig, Voit & Mayer, Ltd.

(57) ABSTRACT

A method produces a hollow electrical insulator. The method includes: winding first wound layers of a first fiber element onto a core; and winding second wound layers of a second fiber element onto an end region of the core. The first wound layers have turns of the first fiber element which enclose a first winding angle with a main direction of extension of the core. The second wound layers have turns of the second fiber element which enclose a second winding angle with the main direction of extension of the core which is larger than the first winding angle. An inner region of the core remains free of second wound layers.

12 Claims, 6 Drawing Sheets

(51) Int. Cl.
  *B29C 70/32*    (2006.01)
  *H01B 17/56*    (2006.01)
  *H01B 19/00*    (2006.01)
  *B29K 63/00*    (2006.01)
  *B29K 309/08*    (2006.01)
  *B29L 31/34*    (2006.01)

(52) U.S. Cl.
  CPC ...... *B29K 2063/00* (2013.01); *B29K 2309/08* (2013.01); *B29L 2031/3412* (2013.01)

(56) References Cited

U.S. PATENT DOCUMENTS 4,958,049 A * 9/1990 Alfieri .................. H01B 19/00
                                                              174/209
2001/0040046 A1   11/2001 Hoefner

FOREIGN PATENT DOCUMENTS

| | | |
|---|---|---|
| DE | 19856123 A1 | 7/2000 |
| DE | 10235438 A1 | 11/2003 |
| EP | 0412823 A2 | 2/1991 |
| WO | WO 2011026519 A1 | 3/2011 |

* cited by examiner

METHOD FOR PRODUCING A HOLLOW ELECTRICAL INSULATOR, HOLLOW ELECTRICAL INSULATOR AND USE OF A HOLLOW ELECTRICAL INSULATOR

CROSS REFERENCE TO RELATED APPLICATIONS

This application is a U.S. National Phase application under 35 U.S.C. § 371 of International Application No. PCT/EP2020/064549, filed on May 26, 2020, and claims benefit to German Patent Application No. DE 10 2019 117 501.1, filed on Jun. 28, 2019. The International Application was published in German on Dec. 30, 2020, as WO 2020/259939 A1 under PCT Article 21(2).

FIELD

The present invention relates to a method for producing a hollow electrical insulator, a hollow electrical insulator, and a use of a hollow electrical insulator are disclosed.

BACKGROUND

A method for producing a hollow electrical insulator and a hollow electrical insulator are described, for example, in WO 2011/026519 A1.

SUMMARY

In an embodiment, the present disclosure provides a method that produces a hollow electrical insulator. The method includes: winding first wound layers of a first fiber element onto a core; and winding second wound layers of a second fiber element onto an end region of the core. The first wound layers have turns of the first fiber element which enclose a first winding angle with a main direction of extension of the core. The second wound layers have turns of the second fiber element which enclose a second winding angle with the main direction of extension of the core which is larger than the first winding angle. An inner region of the core remains free of second wound layers.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
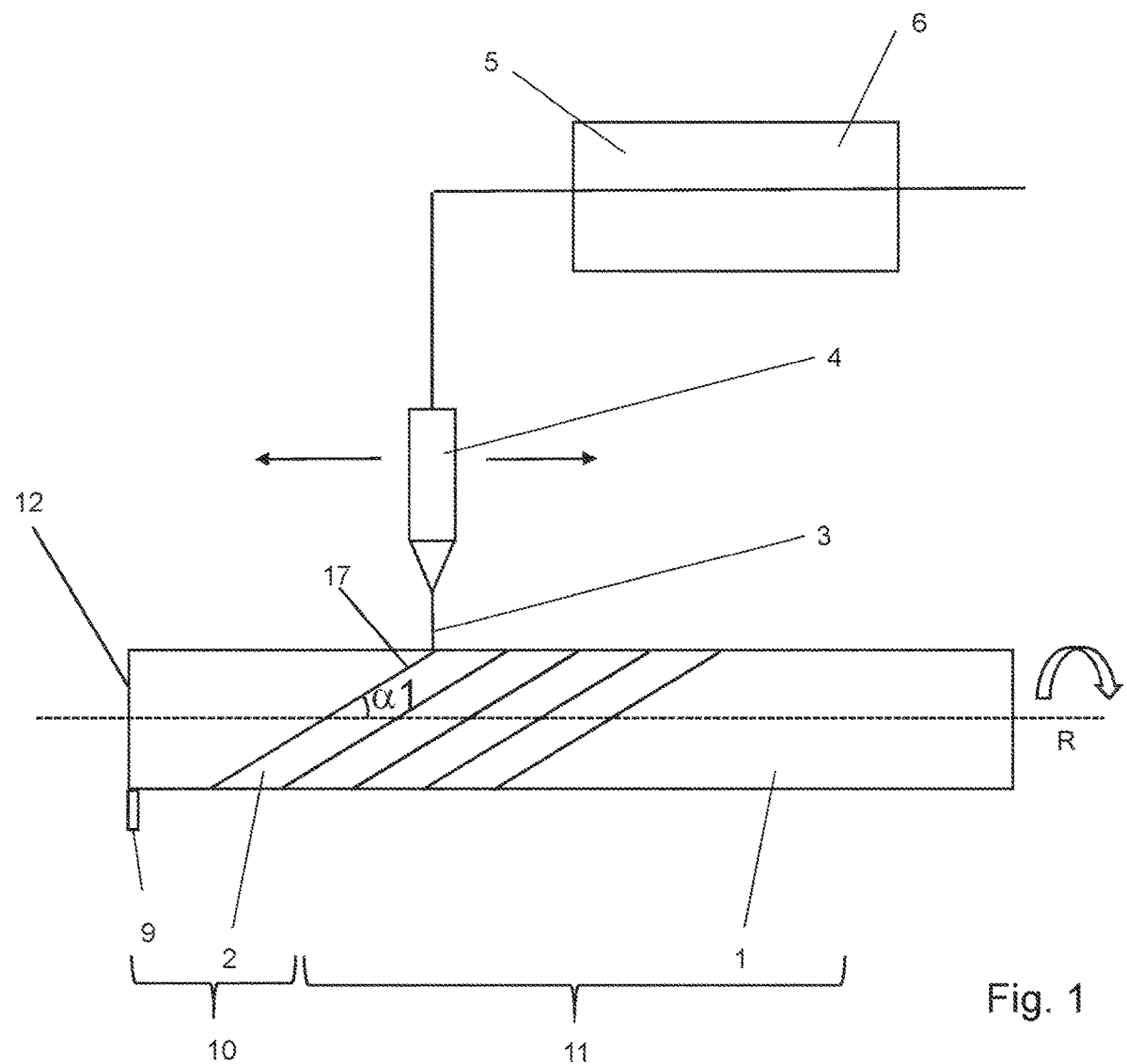
FIGS. 1 to 3 illustrate a method for producing a hollow electrical insulator according to a first exemplary embodiment.

Aspects of the present disclosure provide a hollow electrical insulator having increased strength and/or increased stiffness in at least one end region. Furthermore, aspects of the present disclosure provide a simplified method for producing a hollow electrical insulator. Lastly, the present disclosure describes an advantageous use of the hollow electrical insulator.

According to one embodiment of the method for producing a hollow electrical insulator, a core is provided. The core generally has an elongate shape. Preferably, an envelope of the core is rotationally symmetrical about an axis of rotation of the core. For example, the envelope has the shape of a cylinder or an ellipsoid. In addition, the core preferably has a main direction of extension that is parallel to the axis of rotation of the envelope of the core.

According to a further embodiment of the method, first wound layers of a first fiber element are wound onto the core. For this purpose, the first fiber element is preferably guided onto the core by a fiber head. Either the fiber head or the core is moved at a, preferably constant, speed along the main direction of extension of the core, wherein the core is simultaneously rotated about its axis of rotation, preferably also at a uniform speed. Preferably, the first wound layers are wound along the entire length of the core.

According to a further embodiment of the method, second wound layers of a second fiber element are wound onto an end region of the core. The winding of the second wound layers onto the end region of the core is generally performed here in the same way as the winding of the first wound layers described in the previous paragraph.

The first and/or second fiber element preferably has a plurality of fibers or is formed from a plurality of fibers. The fibers of the first and/or the second fiber element particularly preferably comprise glass, such as an E-glass, or are formed from an E-glass. The E-glass is in particular an aluminum borosilicate glass with less than 2% alkali oxides.

Furthermore, plastic fibers, for example polyester fibers or amide fibers, can also be suitable for the fiber element. The fibers of the fiber element can also be pre-impregnated with an uncured polymer resin ("prepreg"). In this case, the fibers are coated with the uncured resin, for example an epoxy resin. The first and/or the second fiber element can be a fiber bundle or a roving.

Particularly preferably, the first fiber element and the second fiber element are of the same design. This has the advantage that the fiber element on the fiber head does not have to be changed between the winding of the first wound layers and the winding of the second wound layers.

The winding of the second wound layers of the second fiber element is particularly preferably performed only in the end region of the core. The core generally has two opposing end faces, wherein the end region of the core is adjacent to one of the two end faces.

Preferably, the first wound layers have turns of the first fiber element, which enclose a first winding angle with the main direction of extension of the core. Preferably, the second wound layers comprise turns of the second fiber element, which enclose a second winding angle with the main direction of extension of the core. Here, the second winding angle is preferably larger than the first winding angle. Particularly preferably, the second winding angle is at least twice as large as the first winding angle. Preferably, the first winding angle is between 10° and 60° inclusive, particularly preferably between 20° and 54° inclusive. Preferably, the second winding angle is between 70° and 90° inclusive, particularly preferably between 80° and 90° inclusive.

As used herein, the term "winding" refers to that portion of the fiber element of a wound layer that completely encircles the core or finished hollow electrical insulator once. Each wound layer generally has a plurality of turns or is composed of a plurality of turns. Two directly adjacent turns of a wound layer are preferably directly adjacent to each other. The turns of a wound layer may all have the same winding angle. Furthermore, it is also possible that the winding angles of the turns of a wound layer are different.

According to a particularly preferred embodiment of the method, an inner region of the core remains free of second wound layers. In this case, the inner region is adjacent to the end region. In other words, the second wound layers are particularly preferably applied only to the end region of the core.

By means of the second wound layers, which are applied only in an end region of the core, a mechanical reinforcement of the finished hollow electrical insulator can advantageously be achieved in the end region.

According to a further embodiment of the method, the first wound layers and the second wound layers are alternately wound on top of each other. In other words, one or more first wound layers and one or more second wound layers are always alternately wound onto the core. In this way, the second wound layers can be integrated particularly well into the first wound layers.

Alternatively, it is also possible to first wind all of the second wound layers onto the end region of the core and then wind all of the first wound layers along the entire length of the core to produce the hollow electrical insulator.

According to a further embodiment of the method, the second wound layers are wound with increasing number on a smaller region of the end region starting from the end face of the core. In other words, each second wound layer preferably covers a smaller region along the main direction of extension starting from the end face of the core than the previous second wound layer. In particular, the second wound layers have fewer turns as the number of second wound layers increases. In this way, a particularly good strength of the end region of the finished hollow electrical insulator can be achieved.

According to a particularly preferred embodiment of the method, the second wound layers are not wound using turning means. In other words, the core is preferably free of turning means when winding the second wound layers. The turning means may be, for example, protrusions on the core or pins, which protrusions are attached in the end region of the core or to the end face and prevent the turns from slipping off the core.

When using turning means, an excess volume of the wound fiber element usually forms at the end of the core. As a rule, the material of the excess volume is removed, for example by grinding. However, this usually cuts fibers of the fiber element, thus reducing the strength and/or stiffness of the finished hollow electrical insulator.

In particular, it is possible in the present case to apply the second wound layers of the second fiber element without using turning means in the end region of the core, since the second wound layers have a comparatively large winding angle, preferably between 70° and 90° inclusive. Thus, the method can be simplified by a reduction in process steps and a hollow electrical insulator with improved mechanical stability can be obtained.

According to a further embodiment of the method, the first fiber elements and/or the second fiber elements are passed through a liquid matrix material prior to winding. For example, the liquid matrix material is provided in a bath. The liquid matrix material is typically an uncured polymer resin, for example an uncured epoxy.

Furthermore, it is also possible that the matrix material is introduced into the first wound layers and/or into the second wound layers after winding, for example with the aid of vacuum and/or pressure.

According to one embodiment of the method, the matrix material is cured, preferably at the end of the method. In this way, a mechanically stable hollow electrical insulator is obtained.

The method described here is suitable for producing a hollow electrical insulator. All features and embodiments described herein in conjunction with the method can consequently also be implemented in the hollow electrical insulator, and vice versa.

According to one embodiment, the hollow electrical insulator comprises first wound layers of a first fiber element.

According to another embodiment, the hollow electrical insulator comprises second wound layers of a second fiber element in an end region of the hollow electrical insulator.

The hollow electrical insulator generally comprises a wall defining an internal cavity. The first wound layers and the second wound layers are generally surrounded by the wall or form the wall.

The hollow electrical insulator particularly preferably has a cylindrical shape or a shape having an envelope with a cylindrical shape. Particularly preferably, the shape of the hollow electrical insulator is rotationally symmetrical with respect to an axis of rotation of the hollow electrical insulator. The axis of rotation of the hollow electrical insulator is preferably arranged parallel to a main direction of extension of the hollow electrical insulator.

According to another embodiment of the hollow electrical insulator, the first wound layers comprise turns of the first fiber element which enclose a first winding angle with the main direction of extension of the hollow electrical insulator.

According to a further embodiment of the hollow electrical insulator, the second wound layers comprise turns of the second fiber element which enclose a second winding angle with the main direction of extension of the hollow electrical insulator. The second winding angle is particularly preferably greater than the first winding angle, preferably at least twice as great. The first winding angle is preferably between 10° and 60° inclusive, more preferably between 20° and 54° inclusive. The second winding angle is preferably between 70° and 90° inclusive, particularly preferably between 80° and 90° inclusive.

Particularly preferably, an inner region of the hollow electrical insulator is free of second wound layers. Consequently, the second wound layers are preferably arranged only in at least one end region of the hollow electrical insulator. However, it is also possible that a second end region of the hollow electrical insulator opposite the first end region is also provided with second wound layers. The second wound layers form a mechanical reinforcement in the end region of the hollow electrical insulator. In this way, the strength and/or stiffness of the hollow electrical insulator in the end region can advantageously be reinforced.

In addition, the second wound layers generally have the advantage of increasing the wall thickness in the end region of the hollow electrical insulator. This geometric change alone advantageously results in increased rigidity, at least in the end region.

Particularly preferably, the first wound layers and the second wound layers are arranged alternately with each other. In this way, the second wound layers can be integrated particularly well into the first wound layers, so that the strength and/or the stiffness of the hollow electrical insulator is improved.

According to a particularly preferred embodiment of the hollow electrical insulator, the number of second wound layers increases toward an outer surface of the hollow electrical insulator from the inner region toward the end face of the hollow electrical insulator. In other words, each second wound layer preferably covers a smaller region along the main direction of extension starting from the end face of the hollow electrical insulator than the previous second wound layer. In particular, the second wound layers have fewer turns as the number of second wound layers increases. In this way, a particularly good strength of the end region of the hollow electrical insulator can be achieved.

Particularly preferably, the wall of the hollow electrical insulator has a greater thickness adjacently to the end face of the hollow electrical insulator than adjacently to the inner region. This can be achieved, for example, by decreasing the number of turns of the second wound layers as the number of second wound layers increases. Accordingly, the outer surface of the end region of the hollow electrical insulator has, for example, an inclined surface directly adjacently to the inner region.

Particularly preferably, the second wound layers of the hollow electrical insulator are free of severed fibers, at least within the manufacturing tolerances. In the present case, this means in particular that at least 90% and particularly preferably at least 95% of the fiber elements of the second wound layers are free of severed fibers.

The hollow electrical insulator is particularly preferably a plastic tube reinforced with glass fibers (GRP tube).

The hollow electrical insulator described here is particularly suitable for providing a bushing in a transformer. In the case of the hollow electrical insulator proposed herein, the end region of the hollow electrical insulator reinforced with the second wound layers can be used in particular for fastening by means of a flange. A hollow electrical insulator which is used in particular to provide a bushing in a transformer, is frequently subjected to high mechanical loads in the end region, which is usually provided with a flange, due to a bending stress or also due to a compressive stress, due to an internal gas pressure. As a result, the hollow electrical insulator can temporarily deform, whereby the connection to the flange, for example with an adhesive, is impaired. Due to the reinforcement in the end region by the second wound layers, the end region of the hollow electrical insulator can be subjected to a higher mechanical load, for example a bending load.

With the method proposed here, a hollow electrical insulator with a high mechanical stability in the end region can be achieved advantageously by means of method steps integrated into the winding process.

Further advantageous embodiments and refinements of the hollow electrical insulator and of the method for producing the hollow electrical insulator will become clear from the exemplary embodiments described below in conjunction with the figures.

Elements that are identical, similar or have the same effect are provided with the same reference signs in the figures. The figures and the proportions of the elements shown in the figures are not to be regarded as to scale. Rather, individual elements, in particular layer thicknesses, may be shown oversized for better representability and/or better understanding.

Figure 2:
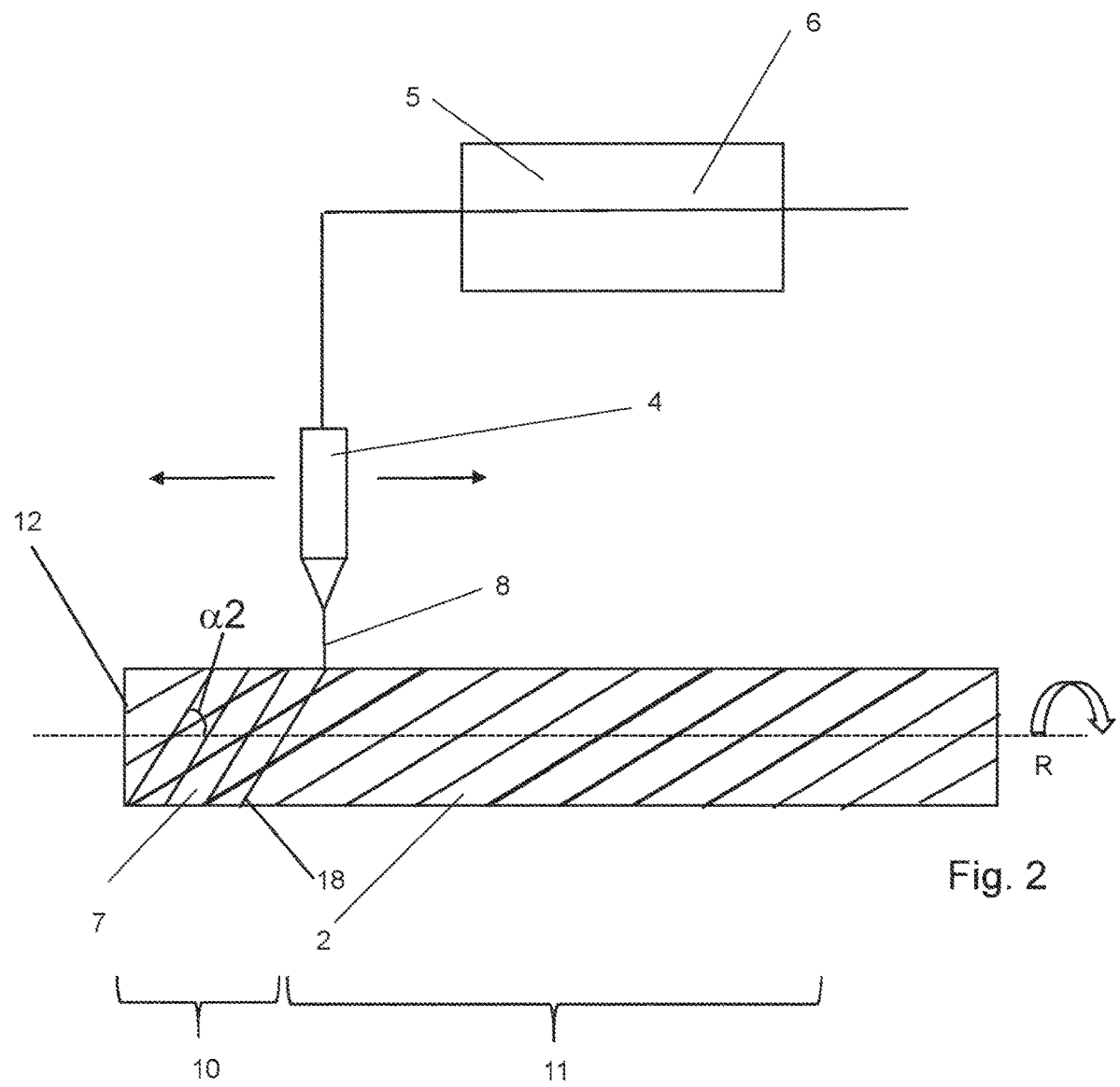
Figure 3:
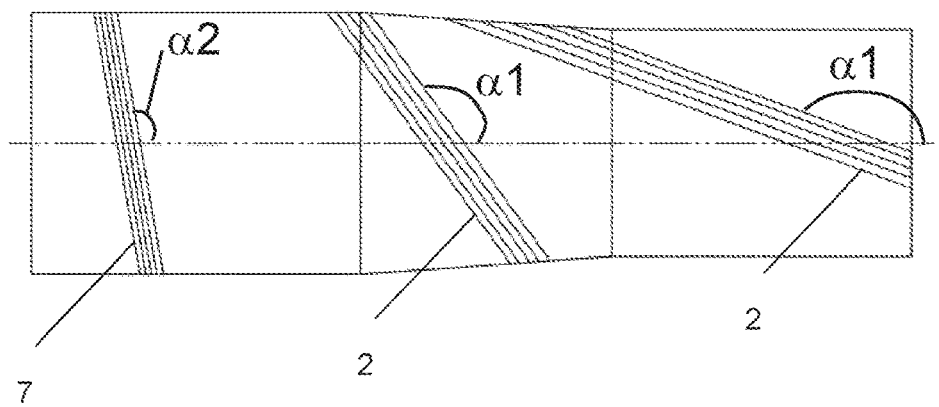

In the method according to the exemplary embodiment of FIGS. 1 to 3, a core 1 is provided in a first step. The core 1 here has a shape with a rotationally symmetrical envelope. For example, the envelope has a cylindrical or an elliptical shape. The envelope is rotationally symmetrical with respect to an axis of rotation R.

In a next step, turns 17 of a first fiber element 3 are wound onto the core 1 (FIG. 1). The first fiber element 3 is, for example, a bundle of glass fibers. For this purpose, the first fiber element 3 is guided by a fiber head 4, which moves along a main direction of extension of the core 1, which is arranged parallel to the axis of rotation 8 of the core 1 (see the arrows).

The core 1 is here rotated about its axis of rotation R, preferably at a constant speed. For winding a first wound layer 2 of the first fiber element 3, for example over an entire length of the core 1, the first fiber element 3 is first fixed on the core 1. Then, the fiber head 4 is moved from one end face 12 of the core 1 along the main direction of extension to another end face of the core 1. The turns 17 of the first fiber element 3 then form a first wound layer 2 on the core 1. A plurality of first wound layers 2 can now be wound in the same manner.

The turns 17 of the first fiber element 3 of the first wound layer 2 has a first winding angle $\alpha 1$ with the main direction of extension of the core 1. The first winding angle $\alpha 1$ is here between 10° and 60° inclusive.

The turns 17 of the first wound layer 2 may enclose different first winding angles $\alpha 1$ with the main direction of extension (FIG. 3). Furthermore, it is also possible that the turns 17 of different first wound layers 2 enclose different first winding angles $\alpha 1$ with the main direction of extension.

The core 1 has an end region 10 and an inner region 11 which directly adjoins the end region 10. A turning means 9, for example a pin, is arranged on the end face 12 of the core 1. The turning means 9 ensures that the turns 17 of the first fiber element 3 do not slip over the end faces 12 of the core 1.

Before the first fiber element 3 is guided by the fiber head 14 onto the core 1, the first fiber element 3 passes in the present case through a bath 5 containing a liquid matrix material 6, for example an epoxy resin. After passing through the bath 5, the first fiber element 3 is impregnated with the liquid matrix material 6.

In a next step, shown schematically in FIG. 2, a second wound layer 7 of a second fiber element 8 is wound on the end region 10 of the core 1. The second wound layer 7 comprises turns 18 of the second fiber element 8 which enclose a second winding angle $\alpha 2$ with the main direction of extension of the core 1. The second winding angle $\alpha 2$ is here larger than the first winding angle $\alpha 1$, approximately at least twice as large (FIG. 3). Particularly preferably, the value of the second winding angle $\alpha 2$ is between 70° and 90° inclusive. A plurality of second wound layers 7 can now be applied one above the other. The turns 18 of a second wound layer 7 may enclose different second winding angles $\alpha 2$ with the main direction of extension. Furthermore, it is also possible that the turns 18 of different second wound layers 7 enclose different second winding angles $\alpha 2$ with the main direction of extension.

The second wound layer 7 of the second fiber element 8 is wound only in the end region 10 of the core 1. The inner region 11 of the core 1 remains free here of the second wound layer 7. It is also possible that a second wound layer 7 of the second fiber element 8 is also wound on a further end region.

Particularly preferably, in the method according to the exemplary embodiment of FIGS. 1 to 3, a turning means 9 at the end face 12 of the core 1 is only used when winding the first wound layers 2, while the second wound layers 7 are applied to the core 1 without the use of a turning means 9.

One or more further first wound layers 2 of the first fiber element 3 and one or more further second wound layers 7 of the second fiber element 8 are now wound onto the core 1 in alternating sequence.

The liquid matrix material 6 is then cured. In this way, a mechanically stable hollow electrical insulator is produced.

Figure 4:
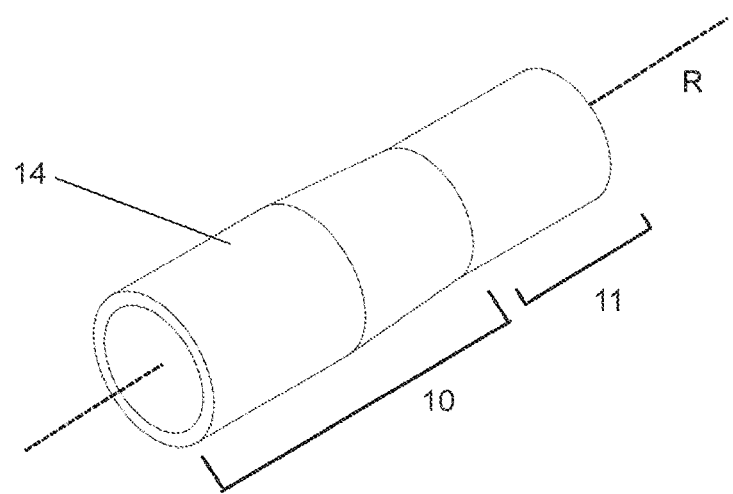
FIGS. 4 and 5 show schematic representations of a hollow electrical insulator according to an exemplary embodiment.
Figure 5:
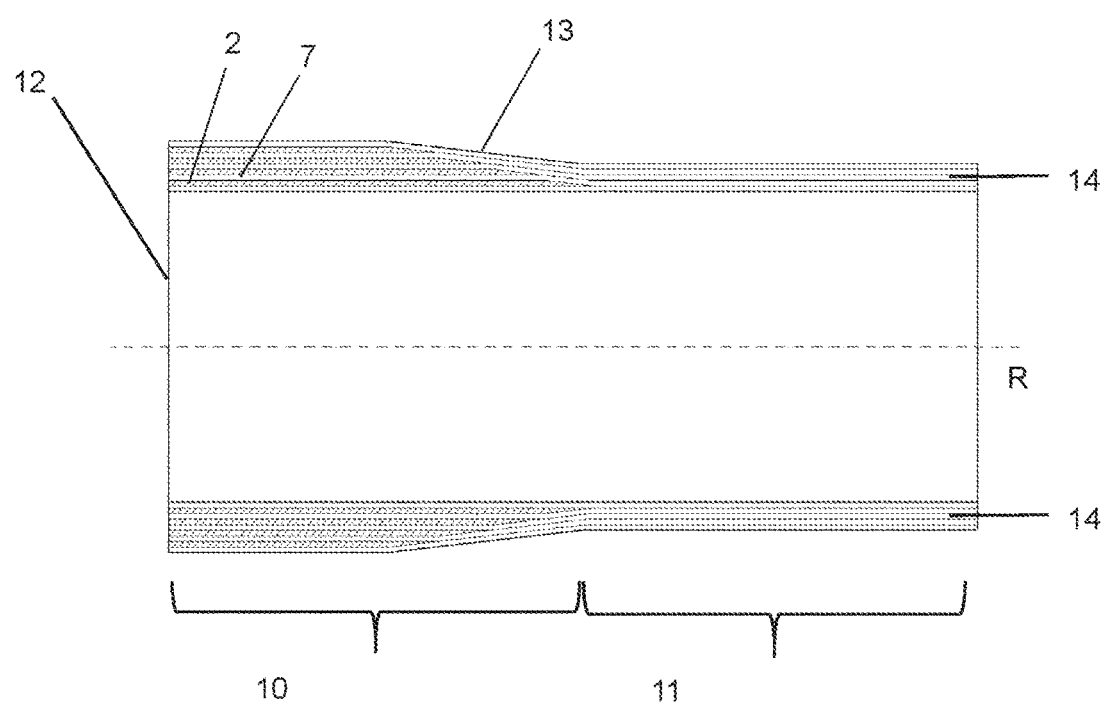

The hollow electrical insulator according to the exemplary embodiment of FIGS. 4 and 5 has an envelope with a cylindrical shape, as shown for example with reference to the perspective schematic diagrams of FIG. 4. The hollow electrical insulator is rotationally symmetrical with respect to an axis of rotation R, which is parallel to a main direction of extension of the hollow electrical insulator. The end region 10 of the hollow electrical insulator here has at least partially a larger cross-sectional area than an inner region 11 of the hollow electrical insulator.

The hollow electrical insulator has a wall 14 defining an interior space. The wall 14 of the hollow electrical insulator comprises the first wound layers 2 and the second wound layers 7. In the inner region 11 of the hollow electrical insulator, only first wound layers 2 are surrounded by the wall 14, while in an end region 10 of the hollow electrical insulator, the first wound layers 2 are arranged alternately with second wound layers 7. Here, the number of second wound layers 7 increases to an outer surface 13 of the hollow electrical insulator starting from the inner region 11 to an end face 12 of the hollow electrical insulator (FIG. 5).

Figure 6:
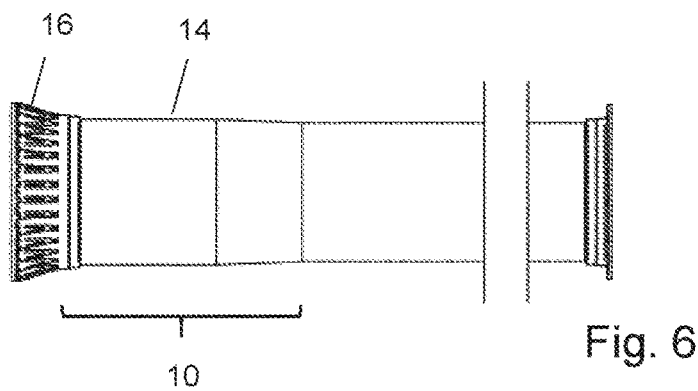
FIGS. 6 to 9 show schematic representations of a hollow electrical insulator according to further exemplary embodiments.
Figure 7:
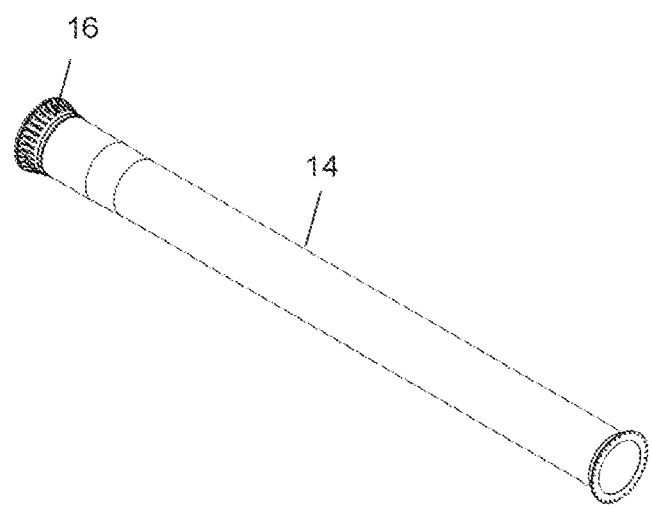
Figure 8:
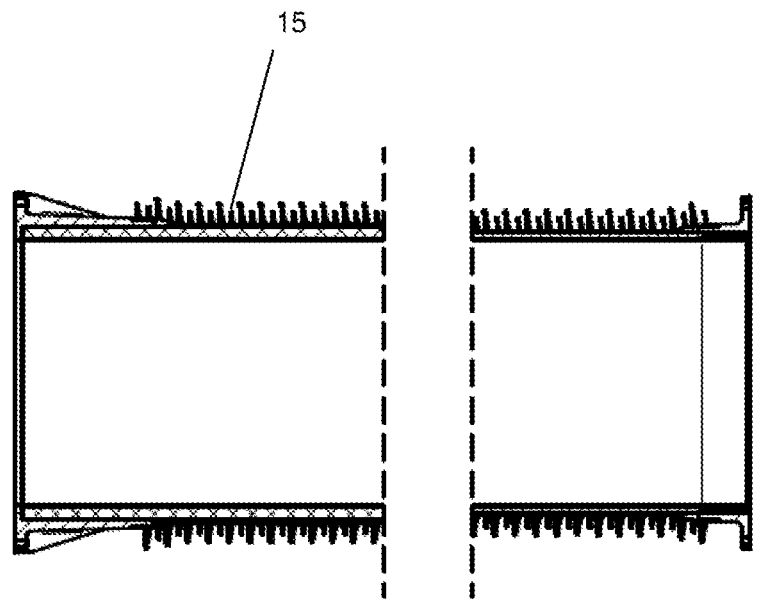
Figure 9:
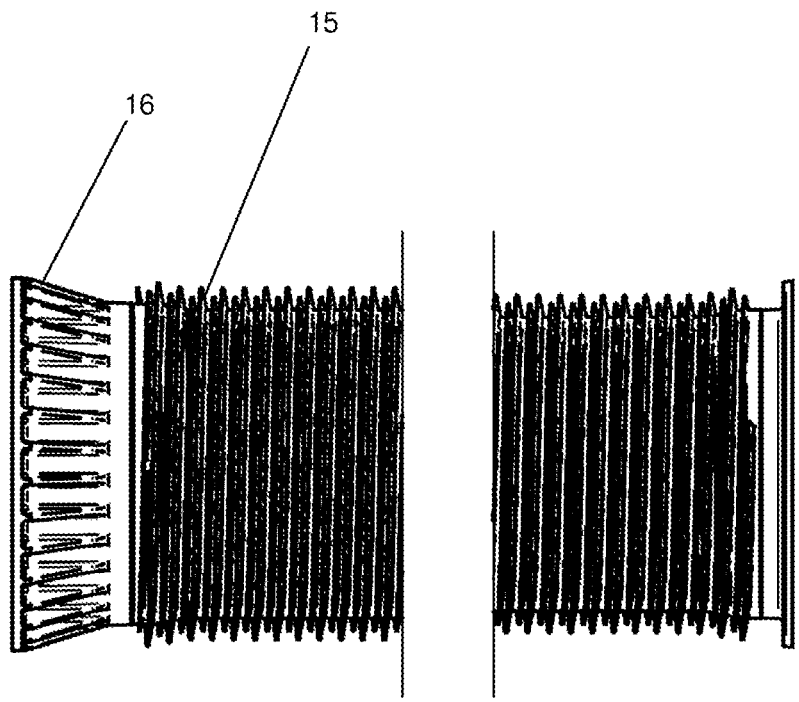

In the hollow electrical insulator according to the exemplary embodiment of FIGS. 6 and 7, a flange 16 is attached to the end face 12. Furthermore, in the hollow electrical insulator according to the exemplary embodiment of FIGS. 8 and 9, a shielding 15 is provided on the outer surface 13 of the hollow electrical insulator, for example a silicone shielding. A hollow electrical insulator provided with a flange 16 and a shielding 15 is particularly suitable for use as a bushing to a transformer.

The invention is not limited to the description based on the exemplary embodiments. Rather, the invention comprises any new feature as well as any combination of features, which in particular includes any combination of features in the claims, even if this feature or this combination itself is not explicitly stated in the claims or exemplary embodiments.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 core
2 first wound layer
3 first fiber element
4 fiber head
5 bath
6 matrix material
7 second wound layer
8 second fiber element
9 turning means
10 end region
11 inner region
12 end face
13 outer face
14 wall
15 shielding
16 flange
17 turn of the first fiber element
18 turn of the second fiber element
α1 first winding angle
α2 second winding angle
R axis of rotation

The invention claimed is:

1. A method for producing a hollow electrical insulator, the method comprising:
   winding first wound layers of a first fiber element onto a core; and
   winding second wound layers of a second fiber element onto an end region of the core, wherein:
   the first wound layers have turns of the first fiber element which enclose a first winding angle with a main direction of extension of the core,
   the second wound layers comprise turns of the second fiber element which enclose a second winding angle with the main direction of extension of the core which is larger than the first winding angle, and
   an inner region of the core remains free of second wound layers,
   the first winding angle is between 10° and 60°, inclusive,
   the second winding angle is between 70° and 90°, inclusive, and
   the second wound layers are not wound using a turning means.

2. The method as claimed in claim 1,
   wherein the first wound layers and the second wound layers are alternately wound on top of each other.

3. The method as claimed in claim 1,
   wherein the second wound layers are wound with increasing number onto a smaller region of the end region starting from an end face of the core.

4. The method as claimed in claim 1,
   wherein the first fiber elements or the second fiber elements are passed through a liquid matrix material prior to winding.

5. A hollow electrical insulator, the hollow electrical insulator comprising:
   first wound layers of a first fiber element; and
   second wound layers of a second fiber element in an end region of the hollow electrical insulator, wherein:
   the first wound layers comprise turns of the first fiber element which enclose a first winding angle with a main direction of extension of the hollow electrical insulator,
   the second wound layers comprise turns of the second fiber element which enclose a second winding angle with the main direction of extension of the hollow electrical insulator which is greater than the first winding angle,
   an inner region of the hollow electrical insulator is free of second wound layers,
   the first winding angle is between 10° and 60°, inclusive,
   the second winding angle is between 70° and 90°, inclusive, and
   the second wound layers were not wound using a turning means.

6. The hollow electrical insulator as claimed in claim 5, wherein the first wound layers and the second wound layers are arranged alternately.

7. The hollow electrical insulator as claimed in claim 5, wherein a number of second wound layers starting from an outer surface of the hollow electrical insulator increases from the inner region to an end face of the hollow electrical insulator.

8. The hollow electrical insulator as claimed in claim 5, wherein the second wound layers are free of severed fibers.

9. A bushing for a transformer, the bushing comprising the hollow electrical insulator as claimed in claim 5.

10. The method of claim 1, wherein the turning means are protusions or pins on the core that are configured to prevent turns from slipping off of the core.

11. The method of claim 1, wherein the winding of the first wound layers of the first fiber element onto the core comprises using the turning means to prevent the turns of the first fiber element from slipping off of the core.

12. The hollow electrical insulator of claim 5, wherein the hollow electrical insulator is configured such that the second wound layers were not wound using the turning means to prevent the turns of the second fiber element from slipping off of the core by having no protrusions or pins on the core at an end region or an end face of the core.

* * * * *